United States Patent
Riccio et al.

(10) Patent No.: US 8,134,820 B1
(45) Date of Patent: Mar. 13, 2012

(54) CONTACTOR CONTROL CIRCUIT

(75) Inventors: James E. Riccio, Clearwater, FL (US); Frank S. Brugner, Clearwater, FL (US)

(73) Assignee: Technology Reasearch Corporation

( * ) Notice: Subject to any disclaimer, the term of this patent is extended or adjusted under 35 U.S.C. 154(b) by 397 days.

(21) Appl. No.: 12/231,955

(22) Filed: Sep. 8, 2008

Related U.S. Application Data (60) Provisional application No. 60/993,186, filed on Sep. 10, 2007.

(51) Int. Cl.
*H02H 3/00* (2006.01)
*H02H 7/00* (2006.01)

(52) U.S. Cl. .............. 361/195; 361/2; 361/3; 361/4; 361/5

(58) Field of Classification Search .......... 361/42
See application file for complete search history.

(56) References Cited

U.S. PATENT DOCUMENTS

| | | | |
|---|---|---|---|
| 4,168,516 A * | 9/1979 | Lace | 361/241 |
| 4,229,719 A | 10/1980 | Lemmer | |
| 7,508,638 B2 * | 3/2009 | Hooper | 361/42 |
| 7,542,252 B2 * | 6/2009 | Chan et al. | 361/42 |
| 7,813,091 B2 * | 10/2010 | Bradley et al. | 361/42 |
| 2006/0120007 A1 * | 6/2006 | Legatti | 361/160 |
| 2007/0201170 A1 * | 8/2007 | Hooper | 361/42 |
| 2008/0007878 A1 * | 1/2008 | Gandolfi et al. | 361/42 |
| 2008/0100146 A1 * | 5/2008 | Washington | 307/130 |

* cited by examiner

*Primary Examiner* — Dharti Patel
(74) *Attorney, Agent, or Firm* — Frijouf, Rust & Pyle P.A.

(57) ABSTRACT

A contactor control circuit is disclosed for controlling a contactor connecting an alternating current electrical power source to a load. The contactor control circuit comprises a switching circuit connected in series with the inductor for controlling the conduction of the contactor. The control circuit actuates conduction of current through the inductor for energizing the contactor to connect the alternating current electrical power source to the load. The invention is also incorporated into a circuit for switching a first and a second alternating current electrical power source to a load.

11 Claims, 8 Drawing Sheets

CONTACTOR CONTROL CIRCUIT

CROSS-REFERENCE TO RELATED APPLICATIONS

This application claims benefit of U.S. Patent Provisional application Ser. No. 60/993,186 filed Sep. 10, 2007. All subject matter set forth in provisional application Ser. No. 60/993,186 is hereby incorporated by reference into the present application as if fully set forth herein.

BACKGROUND OF THE INVENTION

1. Field of the Invention

This invention relates to electrical connection and more particularly to an improved contactor control circuit for controlling a contactor connecting an alternating current electrical power source to a load.

2. Background of the Invention

Contactors have been well known in the prior art for enabling a low current input circuit to control high current output circuit. The high current output circuit may be used to power electrical machinery, electrical furnaces, electrical lighting and the like.

Many contactors take the form of a relay switch. A relay switch comprises a movable mechanical switch having high current contacts for the control of the high current output circuit. A low current input circuit having a solenoid winding controls the movement of high current contacts in accordance with the flow of low current in the input circuit.

In many cases, the contactor may take the form of a reversing contactor. In a reversing contactor, a first and a second mechanical relay are connected in electrical parallel for connection of a first and a second power source to a load. Typically, a reversing contactor incorporates a mechanical interlock for preventing simultaneous connection of the first and second power sources to the load.

Many reversing contactors are used in conjunction with multiple sources of electric power such as standby power supplies, standby generators incorporated into permanent installations such as home and building as well as being incorporated into movable installations such as recreational vehicles, motor homes, yachts or the like. Reversing contactors may be used in conjunction with solar generators, wind generators as well as inverter circuits and the like.

Although contactors have been well known in the prior art for several decades, there is a need for a contactor control circuit for controlling a contactor or a transfer connecting an alternating current electrical power source to a load that provides a safe and reliable automatic switching upon the application of power to the contactor control circuit.

Therefore, there is a need in the art for providing a contactor control circuit for controlling a contactor connecting an alternating current electrical power source to a load that provides a safe and reliable automatic switching upon the application of power to the contactor control circuit.

Another object of the invention is to provide a contactor control circuit for controlling a contactor connecting an alternating current electrical power source to a load incorporating safety features related to the alternating current electrical power source.

Another object of the invention is to provide a contactor control circuit for controlling a contactor connecting an alternating current electrical power source to a load capable of operating a reversing contactor for connecting a first and a second alternating current electrical power source to a load.

Another object of the invention is to provide a contactor control circuit for controlling a contactor connecting an alternating current electrical power source to a load incorporating an interlock circuit for preventing the simultaneous connection of a first and a second alternating current electrical power source to a load.

Another object of the invention is to provide a contactor control circuit for controlling a contactor connecting an alternating current electrical power source to a load that is adaptable to either 120 volt operation or 240 volt operation.

Another object of the invention is to provide a circuit for switching a first and a second alternating current electrical power source to a load.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention and the detailed description describing the preferred embodiment of the invention.

SUMMARY OF THE INVENTION

The present invention is defined by the appended claims with specific embodiments being shown in the attached drawings. For the purpose of summarizing the invention, the invention relates to a contactor control circuit for controlling an alternating current electrical power source to a load. The contactor control circuit comprises a switching circuit interposed between the load and the alternating current electrical power source. A driver circuit is connected for controlling the conduction of the switching circuit. A control circuit is connected for actuating and deactuating the driver circuit. A rectifier circuit has a rectifier input for connection to the alternating current electrical power source. The rectifier provides direct current rectifier output to the control circuit for actuating conduction of the driver circuit and the switching circuit to connect the alternating current electrical power source to the load.

In another specific embodiment of the present invention, the invention relates to a contactor control circuit for controlling a contactor connecting an alternating current electrical power source to a load. The contactor has an inductor for energizing the contactor. The contactor control circuit comprises a switching circuit connected in series with the inductor for controlling the conduction of the contactor. A driver circuit is connected for controlling the conduction of the switching circuit. A control circuit is connected for actuating and deactuating the driver circuit. A rectifier circuit has a rectifier input for connection to the alternating current electrical power source. The rectifier provides direct current rectifier output to the control circuit for actuating conduction of the driver circuit and the switching circuit to conduct current through the inductor for energizing the contactor to connect the alternating current electrical power source to the load.

In a more specific example of the invention, the contactor is an alternating current relay operated by an inductor. Preferably, the switching circuit includes a bidirectional switch having a first and a second bidirectional switch input. The driver circuit includes a first and a second driver switch connected to the first and second bidirectional switch inputs, respectively.

The control circuit may include an open neutral circuit for deactuating the driver circuit upon a detection of a disconnected neutral line in the alternating current electrical power source. In another embodiment, the control circuit may include an overvoltage and/or undervoltage circuit for deactuating the driver circuit upon a detection of an undesirable high or low voltage in the alternating current electrical power source. In still another embodiment, the control circuit may include a reverse polarity circuit for deactuating the driver circuit upon a detection of an undesirable reversal of polarity in the alternating current electrical power source. In still a further embodiment, the control circuit may include a ground monitor circuit for deactuating the driver circuit upon a detection of an undesirable open ground. The control circuit may include a time delay circuit for delaying the actuation of the driver circuit for period of time after connection to the alternating current electrical power source.

Preferably, the rectifier circuit comprises a capacitively coupled rectifier circuit having a series capacitor interposed in the rectifier input connected to the alternating current electrical power source. In one example, the rectifier circuit comprises a half wave rectifier circuit including a filter capacitor and a zener diode voltage regulator.

In another example of the invention, the invention relates to a contactor control circuit for controlling a first and a second contactor connecting a first and a second alternating current electrical power source to a load. The first and second contactors have a first and a second inductor for energizing the first and second contactors. The contactor control circuit comprises a first circuit and a second circuit for controlling the first and second contactors. The first circuit includes a first switching circuit connected in series with the first inductor for controlling the conduction of the first contactor. A first driver circuit is connected for controlling the conduction of the first switching circuit. A first control circuit is connected for actuating and deactuating the first driver circuit. A first rectifier circuit has a first rectifier input and a first rectifier output.

The second circuit includes a second switching circuit connected in series with the second inductor for controlling the conduction of the second contactor. A second driver circuit is connected for controlling the conduction of the second switching circuit. A second control circuit is connected for actuating and deactuating the second driver circuit. A second rectifier circuit has a second rectifier input and a second rectifier output. An interlock circuit connects the first circuit to the second circuit for restricting the first and second circuits from simultaneously energizing the first and second contactors.

In another example of the invention, the invention is incorporated into a circuit for switching a first and a second alternating current electrical power source to a load. The circuit comprises a contactor having a first plurality of contactor poles and a second plurality of contactor poles. A first conductor connects the first alternating current electrical power source to the load through the first plurality of contactor poles. A second conductor connects the second alternating current electrical power source to the load through the second plurality of contactor poles. First switching contacts and second switching contacts are secured to a carrier. A bias member urges the first switching contacts into engagement with the first plurality of contactor poles for connecting the first alternating current electrical power source to the load. An inductor urges the second plurality of switching contacts into engagement with the second plurality of contactor poles upon energizing the inductor. An actuator circuit energizes the inductor upon an electrical output of the second alternating current electrical power source for disconnecting the first alternating current electrical power source from the load and for connecting the second alternating current electrical power source to the load.

In a more specific embodiment, the first alternating current electrical power source is a conventional alternating current electrical power source and the second alternating current electrical power source is a standby power supply. All of the first and second switching contacts connectors are secured to the carrier for inhibiting simultaneous connection of the first and second switching contacts with the first and second plurality of contactor poles, respectively. Each of the first and second plurality of contactor poles comprises four contactor poles. The carrier insulates the first switching contacts from the second switching contacts.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
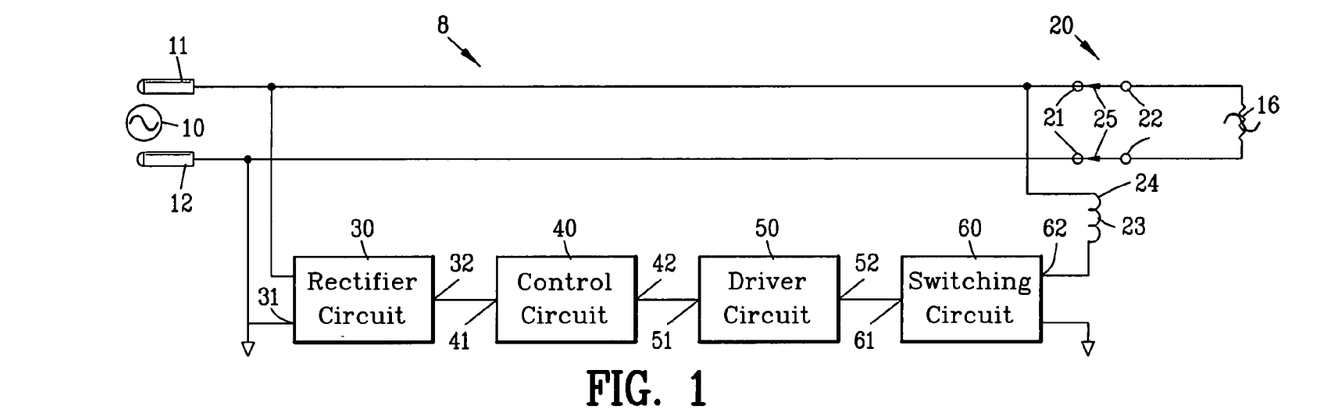
FIG. 1 is a block diagram of a first embodiment of a contactor control circuit of the present invention controlling electrical power to a load through a contactor.

FIG. 1 is a block diagram of a first embodiment of a contactor control circuit 8 of the present invention. The contactor control circuit 8 is powered by an alternating current electrical power source 10. In this embodiment of the invention, the alternating current electrical power source 10 is shown as an alternating current electrical power source having a first terminal 11 and a second terminal 12. The alternating current electrical power source is shown as 120 volt two-wire system (line and neutral) or a 120 volt three-wire system (line, neutral and ground). As will be described in greater detail hereinafter with reference to FIG. 7, the contactor control circuit 8 of the present invention is suitable for use with a 240 volt three-wire system (line, line and neutral) or a 240 volt four-wire system (line, line, neutral and ground). Furthermore, the alternating current electrical power source 10 may be generated from a public utility, an independent alternating current generator or any other suitable source of alternating current electrical power.

The first and second terminals 11 and 12 are connected to a load 16 through a contactor 20. The load 16 may be representative of essentially any type of load 16. In this embodiment of the invention, the contactor 20 is shown as an alternating current relay contactor having an input circuit 21 and an output circuit 22 and an activation circuit 23. The input circuit 21 is connected to the alternating current electrical power source 10. The output circuit 22 is connected to the load 16. The activation circuit 23 comprises an inductor 24 for controlling the position of movable contacts 25. A small electrical current in the inductor 24 in the activation circuit 23 is capable of controlling a large electrical current from the input circuit 21 through the movable contacts 25 to the output circuit 22.

The contactor control circuit 8 actuates and deactuates the contactor for connecting and disconnecting the alternating current electrical power source 10 to the load 16. The contactor control circuit 8 comprises a rectifier circuit 30 having a rectifier circuit input 31 and a rectifier circuit output 32. The rectifier circuit input 31 is connected to the alternating current electrical power source 10.

A control circuit 40 comprises a control circuit input 41 and a control circuit output 42. The rectifier circuit output 32 of the rectifier circuit 30 is connected to the control circuit input 41. The control circuit output 42 is connected to a driver circuit input 51 of a driver circuit 50. A driver circuit output 52 is connected to a switching circuit input 61 of a switching circuit 60. A switching circuit output 62 is connected to the activation circuit 23 of the contactor 20 for controlling a large electrical current from the source 10 through the output circuit 22 of the contactor 20 to the load 16.

Figure 2:
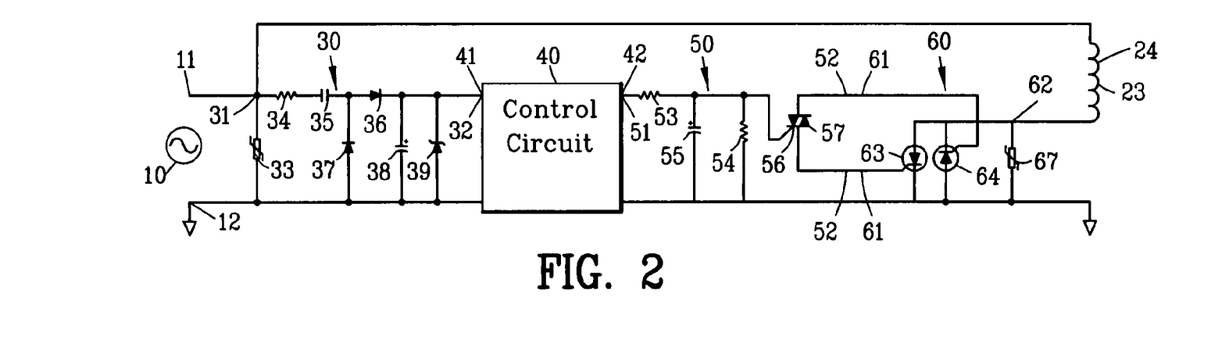
FIG. 2 is a circuit diagram of the contactor control circuit of FIG. 1.

FIG. 2 is a circuit diagram of the contactor control circuit 8 shown in FIG. 1. The rectifier circuit input 31 is connectable to the first and second terminals 11 and 12 of the alternating current electrical power source 10. A metal oxide varistor 33 is connected across the first and second terminals 11 and 12 for suppressing transient voltage present in the alternating current electrical power source 10.

A current limiting resistor 34 connects a series capacitor 35 to a diode 36. A diode 37 is connected between the second terminals 12 and the anode of diode 36 to form a half-wave rectifier. A filter capacitor 38 and a zener diode 39 provide a regulated direct current voltage on the rectifier circuit output 32 to power the control circuit 40. The function and operation of the control circuit 40 will be discussed in greater detail with reference to FIG. 3.

The control circuit output 42 is connected to the driver circuit input 51 of the driver circuit 50. The control circuit output 42 is connected to a voltage divider network comprising resistors 53 and 54. A capacitor 55 cooperates with resistor 53 to form a resistor-capacitor (RC) circuit to introduce a time constant to a voltage rise across resistor 54. The capacitor 55 also stabilizes voltage across resistor 54.

The driver circuit 50 includes a driver switch for controlling the conduction of the switching circuit 60. In this example, the driver switch comprises a first and a second driver switch 56 and 57 configured as a bidirectional solid state switch. The first and second driver switches 56 and 57 are shown as a TRIAC having a common gate.

The voltage divider network comprising resistors 53 and 54 is connected to the common gate of the first and second driver switches 56 and 57. The output of the first and second driver switches 56 and 57 form the driver circuit output 52 of the driver circuit 50.

The driver circuit output 52 is connected to the switching circuit input 61 of the switching circuit 60. The switching circuit 60 comprises a bidirectional solid state switch. In this example, the bidirectional solid state switch comprises a first and a second solid state switch 63 and 64 configured as a bidirectional solid state switch. The first and second switches 63 and 64 are shown as a first and a second thyristors disposed in an antiparallel configuration. In the alternative, a TRAC may replace the first and second solid state switch 63 and 64.

A metal oxide varistor 67 is connected across the first and second terminals of solid state switch 63 and 64. The metal oxide varistor 67 acts in a traditional way for suppressing transient voltages across the first and second solid state switch 63 and 64. In addition, the resistive and capacitive characteristics of the metal oxide varistor 67 act as a snuber circuit to lower the time rate of change voltage (dv/dt) of the voltage rise across the first and second solid state switch 63 and 64.

The outputs of the first and second driver switches 56 and 57 are connected to the gates of the first and second solid state switches 63 and 64. The outputs of the first and second solid state switches 63 and 64 are connected in series with the inductor 24 of the activation circuit 23 of the contactor 20.

Figure 3:
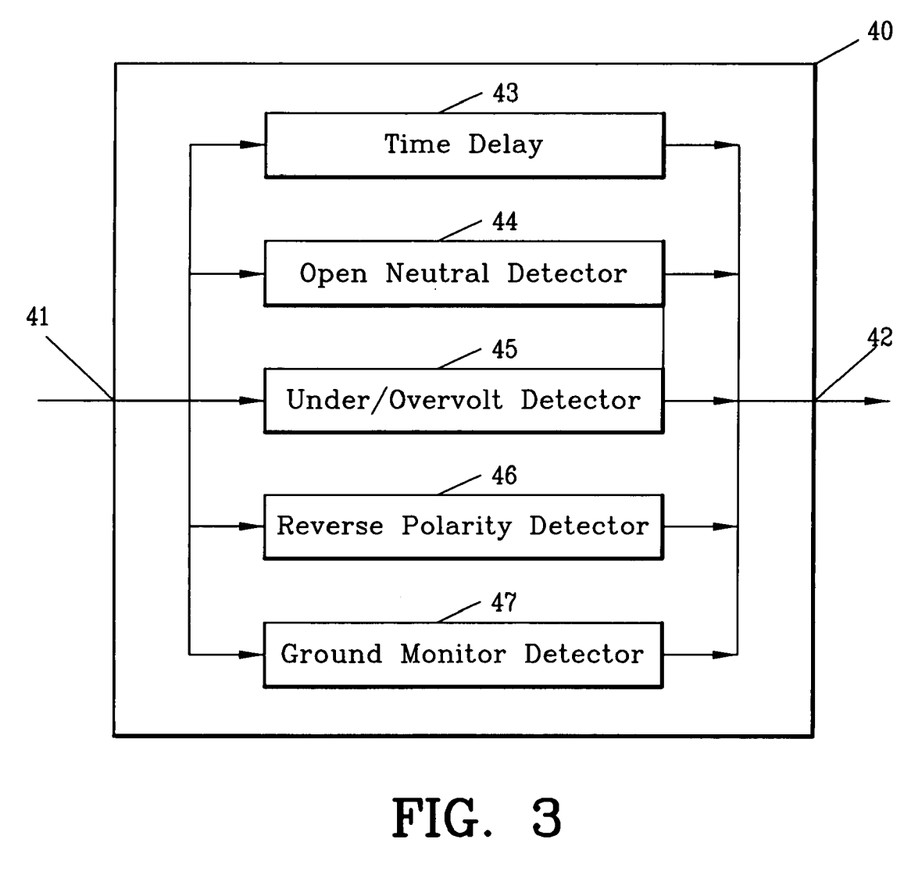
FIG. 3 is a block diagram of the control circuit of FIG. 2.

FIG. 3 is a block diagram of the control circuit 40 of FIG. 2 illustrating various operations thereof. The control circuit 40 is connected for actuating and deactuating the driver circuit 50. The control circuit 40 may include a time delay circuit 43 for delaying actuation of the driver circuit 50 for period of time after connection of the rectified circuit 30 to the alternating current electrical power source 10.

The control circuit 40 may include an open neutral circuit 44 for deactuating the driver circuit 50 upon a detection of a disconnected neutral line of a 240 volt alternating current electrical power source 10. The control circuit 40 may include an overvoltage and/or undervoltage circuit 45 for deactuating the driver circuit 50 upon a detection of an undesirable high or low voltage in the alternating current electrical power source 10.

The control circuit 40 may include a reverse polarity circuit 46 for deactuating the driver circuit 50 upon a detection of an undesirable reversal of polarity in the alternating current electrical power source 10. The control circuit 40 may include a ground monitor circuit 47 for deactuating the driver circuit 50 upon a detection of an undesirable open ground in the alternating current electrical power source 10.

The first embodiment of the contactor control circuit 8 shown in FIGS. 1-3 operates in the following manner. When the rectifier circuit input 31 is connected to the first and second terminals 11 and 12 of the alternating current electrical power source 10, a regulated direct current voltage is present at the rectifier circuit output 32 of the rectifier circuit 30. The regulated direct current voltage at the rectifier circuit output 32 is applied to the control input 41 of the control 40.

The control 40 is actuated by the application of the regulated direct current from the rectifier circuit output 32. The control 40 performs various functions depending upon the circuits 43-47 installed in the control 40. If a time delay circuit 43 is installed in the control 40, the control 40 will delay actuation of the driver circuit 50 for period of time after connection of the rectified circuit 30 to the alternating current electrical power source 10. If an open neutral circuit 44 is installed in the control 40, the control 40 will not actuate the driver circuit 50 upon a detection of a disconnected neutral line of a 240 volt alternating current electrical power source 10.

If an overvoltage and/or undervoltage circuit 45 is installed in the control 40, the control 40 will deactuate the driver circuit 50 upon a detection of an undesirable high or low voltage in the alternating current electrical power source 10. If a reverse polarity circuit 46 is installed in the control 40, the control 40 will deactuate the driver circuit 50 upon a detection of an undesirable reversal of polarity in the alternating current electrical power source 10. If a ground monitor circuit 47 is installed in the control 40, the control 40 will deactuate the driver circuit 50 upon a detection of an undesirable open ground in the alternating current electrical power source 10.

When the control 40 generates a signal on the control output 42, the signal is applied across resistor 54 to actuate the first and second driver switches 56 and 57 into conduction. The conduction of the first and second driver switches 56 and 57 is applied to the gates of the first and second solid state switches 63 and 64. Conduction of the first and second solid state switches 63 and 64 provides a current flow through the inductor 24 of the activation circuit 23 of the contactor 20 for applying the alternating current electrical power source 10 to the load 16.

Figure 4:
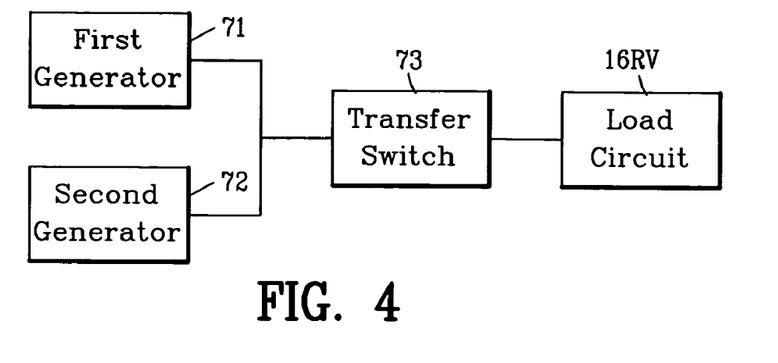
FIG. 4 is a block diagram of the circuit for powering a load from either a first generator or a second generator through a reversing contactor.

FIG. 4 is a block diagram of the circuit for powering a load 16RV from either a first generator 71 or a second generator 72 through a reversing contactor 73. The first generator 71 may be representative of an internal alternating current electrical power source 71 whereas the second generator 72 may be representative of an external alternating current electrical power source 72. The reversing contactor 73 prevents both the first and second generators 71 and 72 from being connected simultaneously to the load 16RV.

Figure 5:
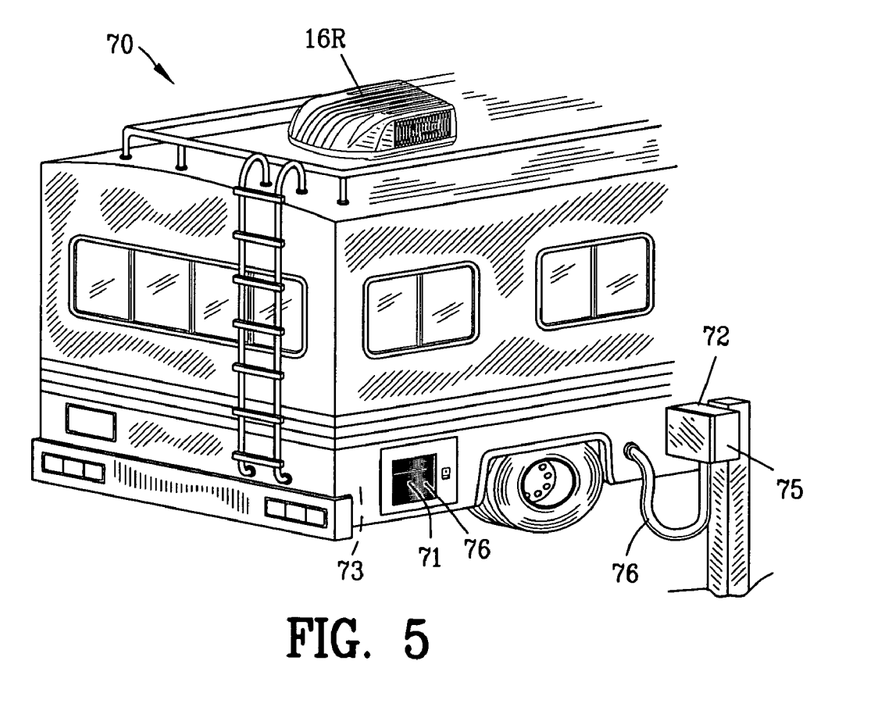
FIG. 5 is an isometric view of an installation having a reversing contactor for transferring electrical power to the installation from either an internal alternating current electrical power source or an external alternating current electrical power source.

FIG. 5 is an isometric view of an installation 70 having a load 16RV shown as an air conditioning unit. Although the installation 70 is shown as a motor home, it should be appreciated that the installation 70 may be any type of installation such as a building or a home as well as any type of vehicle such as a boat, an aircraft or the like. The installation 70 may be powered by either an internal alternating current electrical power source 71 or an external alternating current electrical power source 72 through a reversing contactor 73.

The internal alternating current electrical power source 71 is representative of an alternating current electrical generator powered by an internal combustion engine 76 located within the installation 70. The external alternating current electrical power source 72 is representative of a public utility, an independent alternating current generator or any other suitable source of alternating current electrical power. In this example, the external alternating current electrical power source 72 is located on a pedestal 75 found in many locations such as motor home parks and the like.

In a typical installation such as a motor home 70, the internal alternating current electrical power source 71 powered by the internal combustion engine 76 located within the installation 70 provides electrical power for the load 16RV. When the motor home 70 arrives at a motor home park, the motor home is connected to the external alternating current electrical power source 72 from the pedestal 75 through a power cord 76. The external alternating current electrical power source 72 is commonly referred to as shore power. A mechanical reversing contactor 73 transfers the load 16RV from the internal alternating current electrical power source 71 located within the installation 70 to the external alternating current electrical power source 72.

Figure 6:
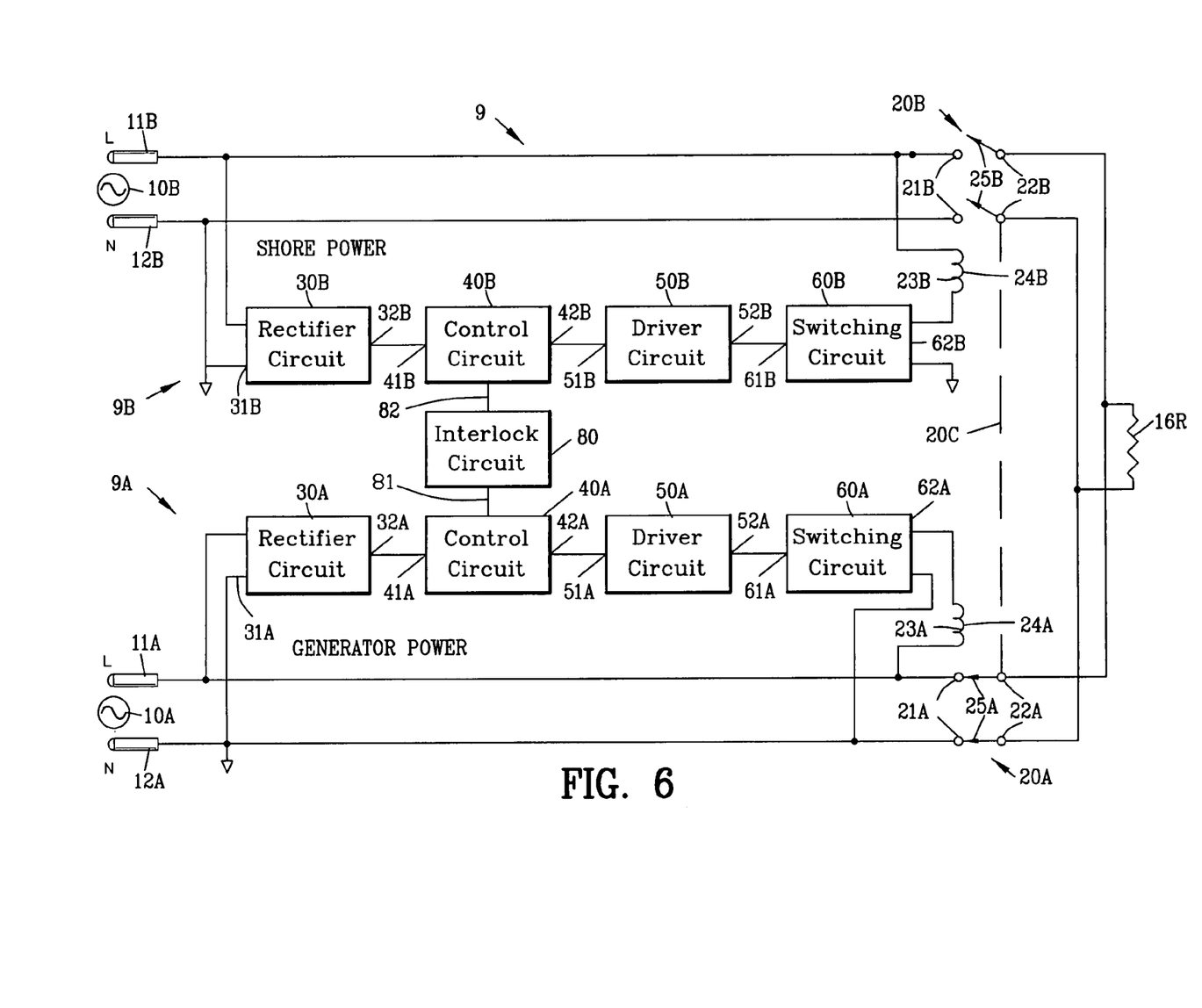
FIG. 6 is a block diagram of a second embodiment of a contactor control circuit of the present invention for transferring electrical power to a load from either an internal alternating current electrical power source or an external alternating current electrical power source.

FIG. 6 is a block diagram of a second embodiment of a contactor control circuit 9 of the present invention for transferring electrical power to a load 16RV such as a motor home 70 from either an internal alternating current electrical power source 71 or an external alternating current electrical power source 72.

The contactor control circuit 9 controls a first and a second contactor 20A and 20B. The first and second contactors 20A and 20B are manually interlocked as indicated by the dashed lines in FIG. 6 to form a reversing contactor 20C. The manual interlock prevents the load 16RV from being connected to the internal alternating current electrical power source 71 and the external alternating current electrical power source 72 simultaneously.

The contactor control circuit 9 comprises a first circuit 9A and a second circuit 9B for controlling the first and second contactors 20A and 20B. Each of the first circuit 9A and the second circuit 9B are virtually identical to the contactor control circuit 8 shown in FIG. 1.

The first circuit 9A includes a first switching circuit 60A connected in series with the first inductor 24A for controlling the conduction of the first contactor 20A. A first driver circuit 50A is connected for controlling the conduction of the first switching circuit 60A. A first control circuit 40A is connected for actuating and deactuating the first driver circuit 50A. A first rectifier circuit 30A has a first rectifier input 31A and a first rectifier output 32A.

The second circuit 9B includes a second switching circuit 60B connected in series with the second inductor 24B for controlling the conduction of the second contactor 20B. A second driver circuit 50B is connected for controlling the conduction of the second switching circuit 60B.

A second control circuit 40B is connected for actuating and deactuating the second driver circuit 50B. A second rectifier circuit 30B has a second rectifier input 31B and a second rectifier output 32B.

The contactor control circuit 9 of the present invention includes an interlock circuit 80 connecting the first circuit 9A to the second circuit 9B through signal connectors 81 and 82. The interlock circuit 80 restricts the first and second circuits 9A and 9B from simultaneously energizing the first and second contactors 20A and 20B. Preferably, the interlock circuit 80 works in concert with the manual interlock of the reversing contactor 20C to prevent simultaneous connection of the internal alternating current electrical power source 71 and the external alternating current electrical power source 72 to the load 16RV.

The interlock circuit 80 determines the dominant electrical power source between the internal alternating current electrical power source 71 and the external alternating current electrical power source 72. Typically in a motor home 70, the internal alternating current electrical power source 71 is the dominant electrical power source over the external alternating current electrical power source 72. Typically in a yacht (not shown) the external alternating current electrical power source 72 is the dominant electrical power source over the internal alternating current electrical power source 71.

The second embodiment of the contactor control circuit 9 shown in FIG. 6 operates in the following manner when installed on a motor home 70 as shown in FIG. 5. When the motor home 70 is in motion, the internal alternating current electrical power source 71 is actuated to provide electrical power to the load 16RV as well as other electrical components in the motor home 70. The internal alternating current electrical power source 71 is rectified by the rectifier circuit 30A to actuate the control circuit 40A. When the control 40A generates a signal on the control output 42A, the signal is applied to the driver circuit 50A to actuate the switching circuit 60A. The actuation of the switching circuit 60A energizes the first contactors 20A to provide power from the internal alternating current electrical power source 71 to the load 16RV.

When the motor home 70 arrives at a mobile home park, the external alternating current electrical power source 72 at the pedestal 75 is connected to the motor home 70 through the power cord 76. The interlock circuit 80 and the manual interlock of the reversing contactor 20C prevents the simultaneous connection of the internal alternating current electrical power source 71 and the external alternating current electrical power source 72 to the load 16RV.

The motor home 70 remains powered by the internal alternating current electrical power source 71 due to the dominance established by the interlock circuit 80 between the internal alternating current electrical power source 71 and the external alternating current electrical power source 72. When the internal alternating current electrical power source 71 is deactuated, power is removed from the first circuit 9A to deactuate the first contactor 20A.

The external alternating current electrical power source 72 is rectified by the rectifier circuit 30B to actuate the control circuit 40B. When the control 40B generates a signal on the control output 42B, the signal is applied to the driver circuit 50B to actuate the switching circuit 60B. The actuation of the switching circuit 60B energizes the first contactors 20B to provide power from the external alternating current electrical power source 72 to the load 16RV.

When the motor home 70 is leaving the mobile home park, the internal alternating current electrical power source 71 is actuated to provide electrical power to the load 16RV. The load 16RV of the motor home 70 is transferred to the internal alternating current electrical power source 71 due to the dominance established by the interlock circuit 80 between the internal alternating current electrical power source 71 and the external alternating current electrical power source 72.

Figure 7:
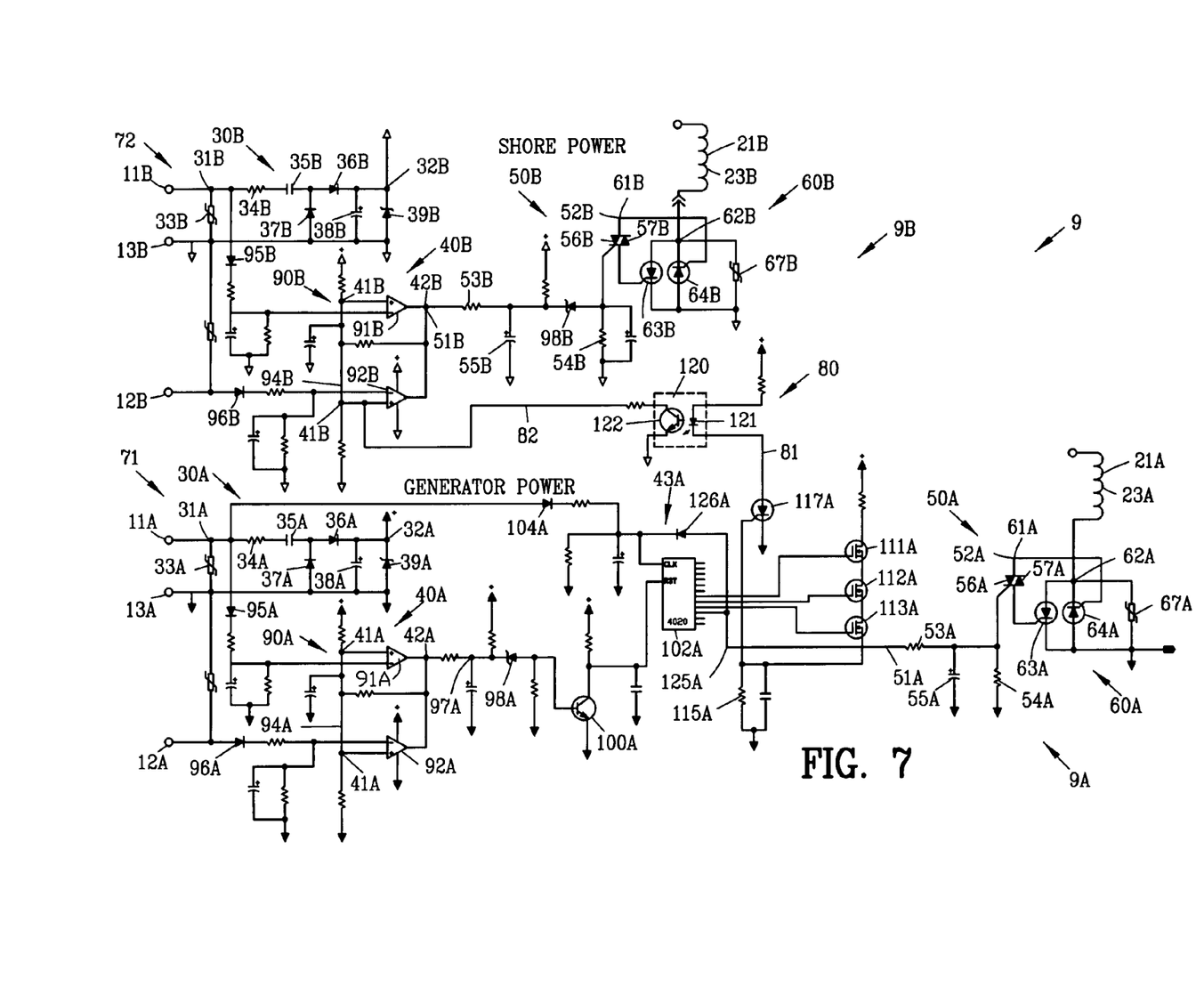
FIG. 7 is a detailed circuit diagram of the control of FIG. 6.

FIG. 7 is a detailed circuit diagram of the contactor control circuit 9 of FIG. 6. In this example of the invention, the internal alternating current electrical power source 71 is an alternating current electrical generator powered by the internal combustion engine 76. The internal alternating current electrical power source 71 operates at 240 volts between the first and second line terminal 11A and 12A with a neutral line connected to a third neutral terminal 13A. The internal alternating current electrical power source 71 provides power to the first circuit 9A designated as generator power in FIG. 7. Although the internal alternating current electrical power source 71 has been shown as a three-wire system, it should be understood that the internal alternating current electrical power source 71 may be a four-wire system.

The external alternating current electrical power source 72 is conventional electric shore power from a public utility or the like. The external alternating current electrical power source 72 operates at 240 volts between the first and second line terminal 11B and 12B with a neutral line connected to a third neutral terminal 13B. The external alternating current electrical power source 72 provides power to the second circuit 9B designated as shore power in FIG. 7. Although the external alternating current electrical power source 72 has been shown as a three-wire system, it should be understood that the external alternating current electrical power source 72 may be a four-wire system.

For the purpose of the explanation of FIG. 7, the contactor control circuit 9 is assumed to be in the following initial conditions. The first and second line terminals 11B and 12B of the second circuit 9B are connected to the external alternating current electrical power source 72. The first and second line terminals 11A and 12A of the first circuit 9A are disconnected from the internal alternating current electrical power source 71. The internal combustion engine 76 powering the internal alternating current electrical power source 71 is in an off condition.

Referring to the second circuit 9B of FIG. 7, the first line terminal 11B and the third neutral terminal 13B of the external alternating current electrical power source 72 are connected to the rectifier circuit 30B of the second circuit 9B in a manner similar to FIG. 2. The first line terminal 11B and the third neutral terminal 13B of the external alternating current electrical power source 72 apply 120 volts to the rectifier circuit 30B of the second circuit 9B. The regulated direct current voltage from the rectifier circuit output 32B is applied to the control input 41B of the control circuit 40B.

In this example, the control circuit 40B incorporates an open neutral circuit 44B as set forth in FIG. 3. In the event there is an open neutral line, the voltage between the first line terminal 11B and the third neutral terminal 13B will vary relative to the voltage between the second line terminal 12B and the third neutral terminal 13B depending upon the load distribution between the first line terminal 11B and the third neutral terminal 13B relative the load distribution between the second line terminal 11B and the third neutral terminal 13B.

The open neutral circuit 44B includes a comparator circuit 90B comprising comparators 91B and 92B. A voltage divider circuit 94B applies the rectifier circuit output 32B to the non-inverting inputs of the comparators 91B and 92B. The voltage divider circuit 94B provides a reference voltage for the comparators 91B and 92B.

The voltage of the first line terminal 11B of the external alternating current electrical power source 72 is applied through diode 95B to the inverting input of the comparator 91B. The resistance capacitance circuit located at the inverting input of the comparator 91B stores the peak value of the voltage of the first line terminal 11B of the external alternating current electrical power source 72.

The comparator 91B compares the peak value of the voltage on the first line terminal 11B relative to the reference voltage from the voltage divider circuit 94B. A nominal voltage between the first line terminal 11B and the third neutral terminal 13B, the reference voltage on the non-inverting input of the comparator 91B provides signal on the control output 42B to the driver circuit 50B. In the event the peak value of the voltage on the first line terminal 11B indicates an over voltage condition, the inverting input of the comparator 91B terminates a signal on the control output 42B to the driver circuit 50B.

In a similar manner, the voltage of the second line terminal 12B of the external alternating current electrical power source 72 is applied through diode 96B to the inverting input of the comparator 92B. The resistance capacitance circuit located at the inverting input of the comparator 92B stores the peak value of the voltage of the second line terminal 11B of the external alternating current electrical power source 72.

The comparator 92B compares the peak value of the voltage on the second line terminal 12B relative to the reference voltage from the voltage divider circuit 94B. A nominal voltage between the second line terminal 12B and the third neutral terminal 13B, the reference voltage on the non-inverting input of the comparator 92B provides signal on the control output 42B to the driver circuit 50B. In the event the peak value of the voltage on the second line terminal 12B indicates an over voltage condition, the inverting input of the comparator 92B terminates a signal on the control output 42B to the driver circuit 50B.

The signal connector 82 of the interlock circuit 80 is connected to the non-inverting input of the comparator 92B. A signal on the signal connector 82 from the interlock circuit 80 will disable the control 40B will be described in greater detail hereinafter.

The signal on the control output 42B is applied to the driver circuit 50B to actuate the switching circuit 60B. A zener diode 98B operates in concert with the resistor 53B and the capacitor 55B to delay the triggering of the driver circuit 50B to allow the internal alternating current electrical power source 72 to stabilize. The actuation of the switching circuit 60B energizes the contactors 20B to provide power from the external alternating current electrical power source 72 to the load 16RV.

Referring to the first circuit 9A of FIG. 7, when the source of electric power is to be transferred from the external alternating current electrical power source 72 to the internal alternating current electrical power source 71, the following actions are undertaken. The internal combustion engine 76 is started to activate the internal alternating current electrical power source 71. The internal alternating current electrical power source 71 applies power to the first circuit 9A in a manner similar to FIG. 2.

The first line terminal 11A and the third neutral terminal 13A of the internal alternating current electrical power source 71 are connected to the rectifier circuit 30A of the first circuit 9A in a manner similar to FIG. 2. The first line terminal 11A and the third neutral terminal 13A of the internal alternating current electrical power source 71 apply 120 volts to the rectifier circuit 30A of the first circuit 9A. The regulated direct current voltage from the rectifier circuit output 32A is applied to the control input 41A of the control circuit 40A.

In this example, the control circuit 40A incorporates an open neutral circuit 44A as set forth in FIG. 3. In the event there is an open neutral line, the voltage between the first line terminal 11A and the third neutral terminal 13A will vary relative to the voltage between the second line terminal 12A and the third neutral terminal 13A depending upon the load distribution between the first line terminal 11A and the third neutral terminal 13A relative the load distribution between the second line terminal 11A and the third neutral terminal 13A.

In this example, the control circuit 40A incorporates a time delay circuit 43A and an open neutral circuit 44A as set forth in FIG. 3. The open neutral circuit 44A includes a comparator circuit 90A comprising comparators 91A and 92A. A voltage divider circuit 94A applies the rectifier circuit output 32A to the non-inverting inputs of the comparators 91A and 92A. The voltage divider circuit 94A provides a reference voltage for the comparators 91A and 92A.

The voltage of the first line terminal 11A of the internal alternating current electrical power source 71 is applied through diode 95A to the inverting input of the comparator 91A. The resistance capacitance circuit located at the inverting input of the comparator 91A stores the peak value of the voltage of the first line terminal 11A of the internal alternating current electrical power source 71.

The comparator 91A compares the peak value of the voltage on the first line terminal 11A relative to the reference voltage from the voltage divider circuit 94A. A nominal voltage between the first line terminal 11A and the third neutral terminal 13A, the reference voltage on the non-inverting input of the comparator 91A provides signal on the control output 42A. In the event the peak value of the voltage on the first line terminal 11A indicates an over voltage condition, the inverting input of the comparator 91A terminates a signal on the control output 42A.

In a similar manner, the voltage of the second line terminal 12A of the internal alternating current electrical power source 71 is applied through diode 96A to the inverting input of the comparator 92A. The resistance capacitance circuit located at the inverting input of the comparator 92A stores the peak value of the voltage of the second line terminal 11A of the internal alternating current electrical power source 71.

The comparator 92A compares the peak value of the voltage on the second line terminal 12A relative to the reference voltage from the voltage divider circuit 94A. A nominal voltage between the second line terminal 12A and the third neutral terminal 13A, the reference voltage on the non-inverting input of the comparator 92A provides signal on the control output 42A. In the event the peak value of the voltage on the second line terminal 12A indicates an over voltage condition, the inverting input of the comparator 92A terminates a signal on the control output 42A.

The control circuit 40A incorporates the time delay circuit 43A for delaying the connection of the load 16RV to the internal alternating current electrical power source 71 powered by the internal combustion engine 76. Preferably a delay of thirty (30) seconds is desired to enable the internal alternating current electrical power source 71 to warm up and to stabilize prior to the application of an electrical load.

The signal from the control output 42A is applied through an integrator circuit 97A and a Zener diode 98A to an input of an inverter circuit 100A. The time delay circuit 43A includes a binary ripple counter 102A. The output of the inverter circuit 100A is connected to a reset input of the binary ripple counter 102A. The binary ripple counter 102A receives positive half cycle pulses from the first terminal 11A through a diode 104A. The half cycle pulses from the first terminal 11A are counted by the binary ripple counter 102A to produce timed outputs to switches 111A-113A shown as MOS FETS. The pulses counted by the binary ripple counter 102A provide the desired thirty (30) second delay.

When the timed output from the binary ripple counter 102A actuates all of the switches 111A-113A, a current flows through resistor 115A to actuate a switch 117A shown as a thyristor. The switch 117A is interposed in series with the signal connector 81 of the interlock circuit 80. The interlock circuit 80 comprises an optocoupler 120 having a light emitting diode 121 optically coupled to a photoswitch 122. The light emitting diode 121 is located in the signal connector 81 of the interlock circuit 80 whereas the photoswitch 122 is located in the signal connector 82 of the interlock circuit 80.

The actuation of thyristor 117 results in the light emitting diode 121 causing conduction of the photoswitch 122. The conduction of photoswitch 122 connects the non-inverting input of the comparator 92B of the second circuit 9B to ground thus disabling the control 40B. The disabling of the control 40B results in the loss of signal to the driver circuit 50B and the switching circuit 60B to open contactor 20B for disconnecting the external alternating current electrical power source 72 from the load 16RV.

The binary ripple counter 102A continues to receive positive half cycle pulses from the first terminal 11A through a diode 104A. After a delay of a few seconds, the binary ripple counter 102A generates a signal on conductor 125A to the driver input 51A of the driver circuit 50A. The signal on conductor 125A from the binary ripple counter 102A is applied to the clock input of the binary ripple counter 102A to cease the counting thereof.

The delay of a few seconds insures that the second circuit 9B is shut down prior to the actuation of the first circuit 9A. The driver circuit 50A actuates the switching circuit 60A. The actuation of the switching circuit 60A energizes the contactors 20A to provide power from the internal alternating current electrical power source 71 to the load 16RV.

The internal alternating current electrical power source 71 will remain connected to the load 16RV during normal operation of the internal alternating current electrical power source 71. The external alternating current electrical power source 72 cannot be actuated until termination of the internal alternating current electrical power source 71. It should be appreciated by those skilled in the art that the dominance of the internal alternating current electrical power source 71 over the external alternating current electrical power source 72 may be reverse for other applications such as standby generators, yachts and the like.

Figure 8:
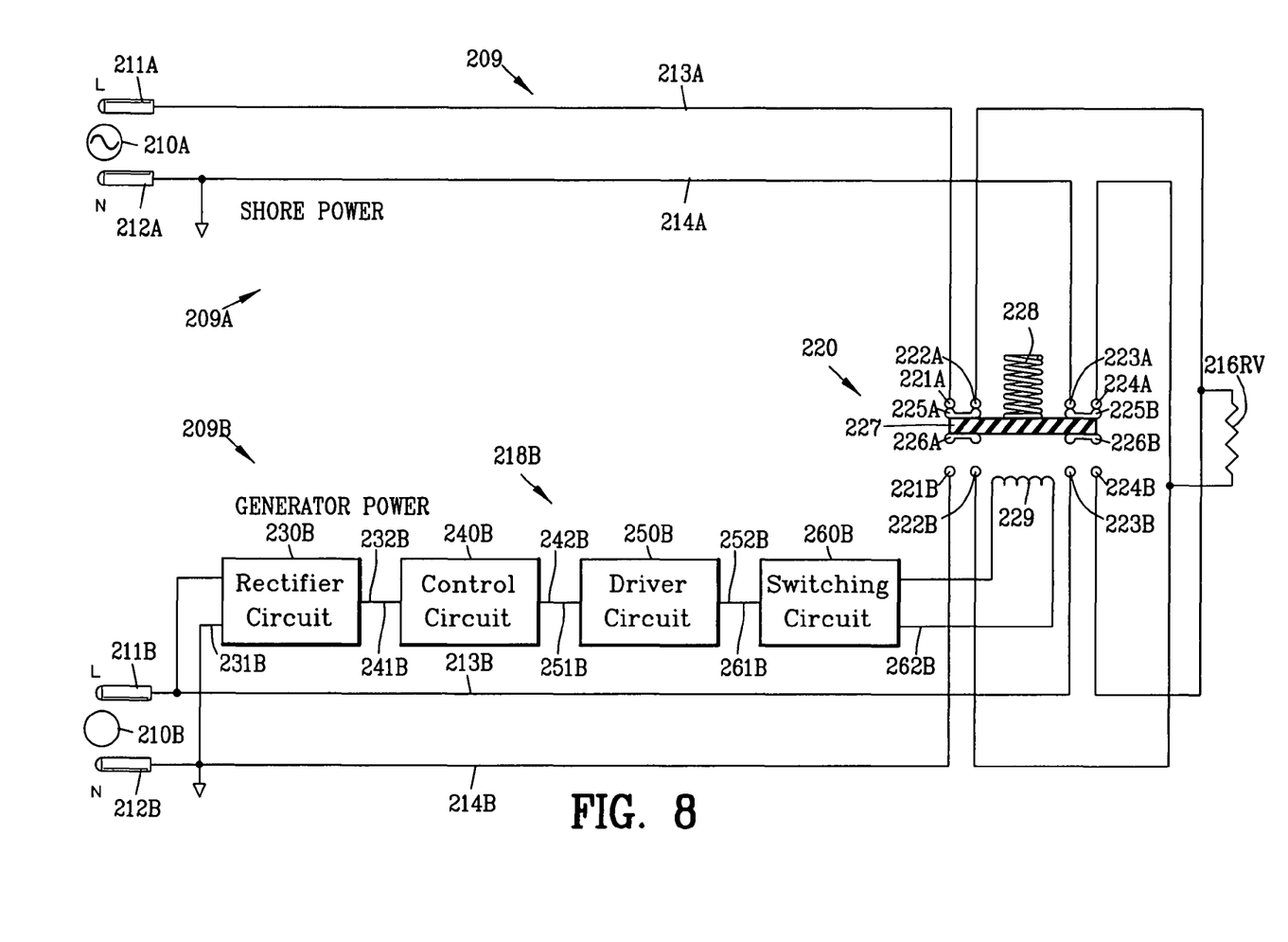
FIG. 8 is a block diagram of a third embodiment of a contactor control circuit of the present invention transferring electrical power to a load from an external alternating current electrical power source.

FIG. 8 is a block diagram of a third embodiment of a circuit 209 of the present invention for switching a first alternating current electrical power source 210A or a second alternating current electrical power source 210B to a load 216RV. The first alternating current electrical power source 210A has plural terminals 211A and 212A whereas the second alternating current electrical power source 210B has plural terminals 211B and 212B. In this example, the terminals 211A and 211B are shown as line terminals and terminals 212A and 212B are shown as neutral terminals.

In this embodiment, the first alternating current electrical power source 210A is shown as a conventional 120 volt alternating current electrical power source commonly referred to as shore power in the marine and recreational vehicle industries. The second alternating current electrical power source 210B is shown as a 120 volt standby power supply such as an internal combustion engine driving an electrical generator as shown in FIGS. 4-5.

Figure 9:
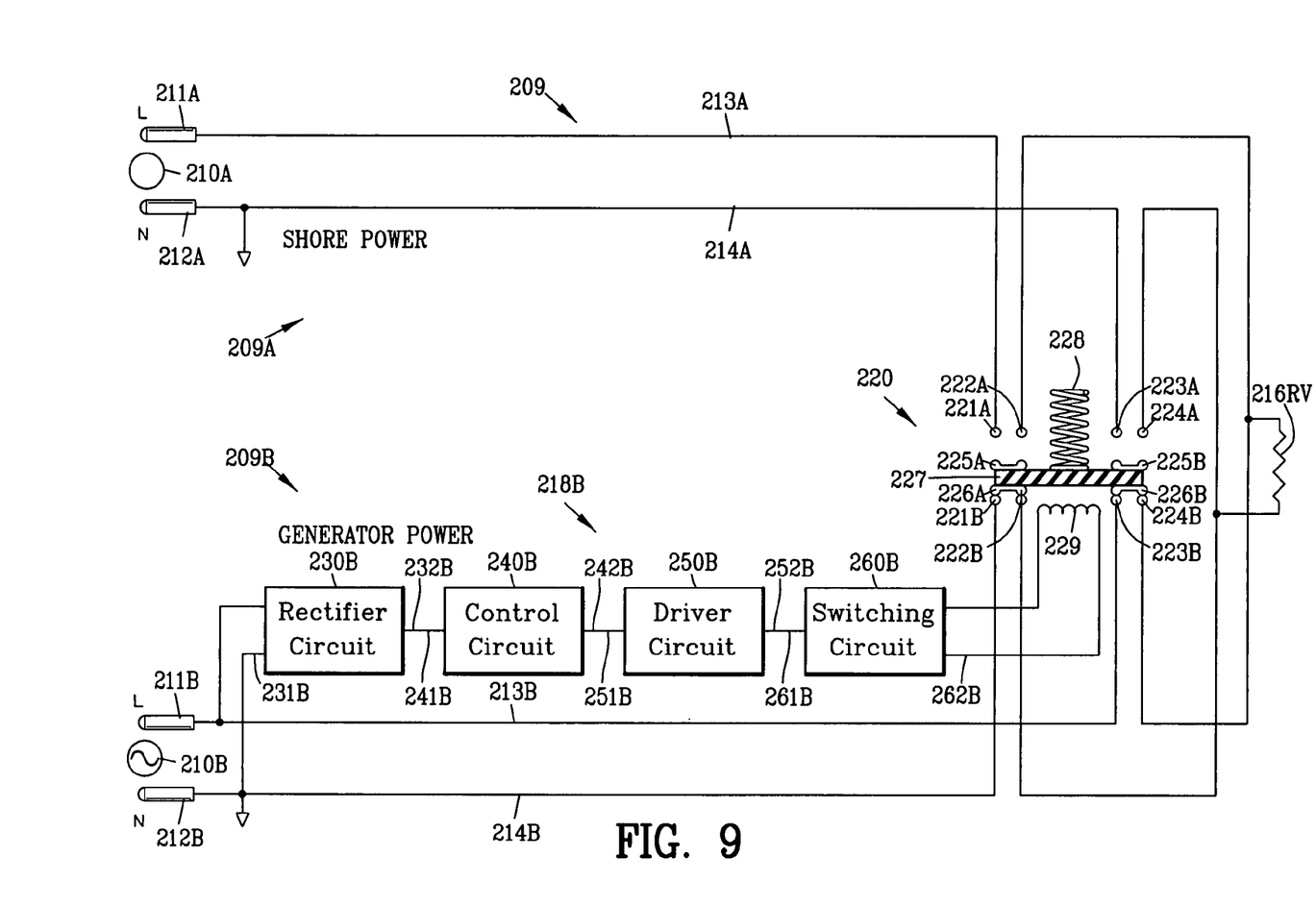
FIG. 9 is a block diagram similar to FIG. 8 illustrating the transfer of electrical power to a load from an internal alternating current electrical power source.

FIG. 8 illustrates the circuit 209 connecting the first alternating current electrical power source 210A (shore power) to the load 216RV whereas FIG. 9 illustrates the circuit 209 connecting the second alternating current electrical power source 210B (standby power supply) to the load 216RV.

The circuit 209 comprises a first circuit 209A and a second circuit 209B. The second circuit 209B includes an actuator circuit 218B for controlling a contactor 220. The contactor 220 has a first plurality of contactor poles 221A-224A and a second plurality of contactor poles 221B-224B. First plural conductor 213A and 214A connect the plural terminals 211A and 212A of the first alternating current electrical power source 210A to the load 216RV through the first plurality of contactor poles 221A-224A. Second plural conductor 213B and 214B connect the plural terminals 211B and 212B of the second alternating current electrical power source 210B to the load 216RV through the second plurality of contactor poles 221B-224B.

A carrier 227 is movably located between the first and second plurality of contactor poles 221A-224A and 221B-224B. First switching contacts 225A and 225B are secured to the carrier 227 adjacent to the first plurality of contactor poles 221A-224A. Second switching contacts 226A and 226B are secured to the carrier 227 adjacent to the second plurality of contactor poles 221B-224B. The carrier 227 insulates the first switching contacts 225A and 225B from the second switching contacts 226A and 226B.

A bias member 228 urges the carrier 227 into a first position as shown in FIG. 8. When the carrier 227 is in the first position, the first switching contacts 225A and 225B engage with the first plurality of contactor poles 221A-224A. The engagement of first switching contacts 225A and 225B with the first plurality of contactor poles 221A-224A connects the first alternating current electrical power source 210A to the load 216RV as shown in FIG. 8. In this example, the bias member 228 is shown as a coil spring but it shown be understood that various type of bias member may be used for urging the first switching contacts 225A and 225B into engagement with the first plurality of contactor poles 221A-224A.

When the carrier 227 is in the first position, the second switching contacts 226A and 226B are displaced from the second plurality of contactor poles 221B-224B. The second switching contacts 226A and 226B provide a double break with the second plurality of switching contacts 221B-224B when the carrier 227 is in the first position.

FIG. 9 illustrates the movement of the carrier 227 into a second position. An inductor 119 operates an armature (not shown) for moving the carrier 227 against the urging of the bias member 228 into a second position as shown in FIG. 9. When the carrier 227 is in the second position, the second switching contacts 226A and 226B engage with the second plurality of contactor poles 221B-224B. The engagement of second switching contacts 226A and 226B with the second plurality of contactor poles 221B-224B connects the second alternating current electrical power source 210B to the load 216RV as shown in FIG. 9.

The movement of the carrier 227 into a second position simultaneously moves the first switching contacts 225A and 225B out of engagement with the first plurality of contactor poles 221A-224A to disconnects the first alternating current electrical power source 210A from the load 216RV.

When the carrier 227 is in the second position, the first switching contacts 225A and 225B are displaced from the first plurality of contactor poles 221A-224A. The first switching contacts 225A and 225B provide a double break with the first plurality of switching contacts 221A-224A when the carrier 227 is in the second position.

The actuator circuit 218B comprises a rectifier circuit 230B having a rectifier input 231B and rectifier output 232B. The input 231B of the rectifier circuit 230B is connected to the second alternating current electrical power source 210B to provide rectified power output to an input 241B of a control circuit 240B. The control circuit 240B provides a control circuit output 242B to an input 251 of a driver circuit 250B. An output 252B of the driver circuit 250B is connected to an input 261B of a switching circuit 260B for controlling the conduction of an output 262B of the switching circuit 260B for energizing the inductor 229.

As will be described in greater detail with reference to FIG. 10, the inductor 229 is energized upon an electrical output of the second alternating current electrical power source 210B. The energizing of the inductor 229 disconnects the first alternating current electrical power source 210A from the load 216RV and connects the second alternating current electrical power source 210B to the load 216RV.

The first switching contacts 225A and 225B and the second switching contacts 226A and 226B are secured to the carrier 227. The movement of the carrier 227 between the first and second plurality of contactor poles 221A-224A and 221B-

224B prevents the load 216RV from being connected simultaneously to the first alternating current electrical power source 210A and the second alternating current electrical power source 210B.

When in the second alternating current electrical power source 210B is in an off condition, the bias member 228 urges the carrier 227 into the first position as shown in FIG. 8. When the carrier is in the first position, the first alternating current electrical power source 210A is connected to power the load 215RV. When in the second alternating current electrical power source 210B is in an on condition, the inductor moves the carrier 227 into the second position as shown in FIG. 9. When the carrier is in the second position, the second alternating current electrical power source 210B is connected to power the load 215RV.

Figure 10:
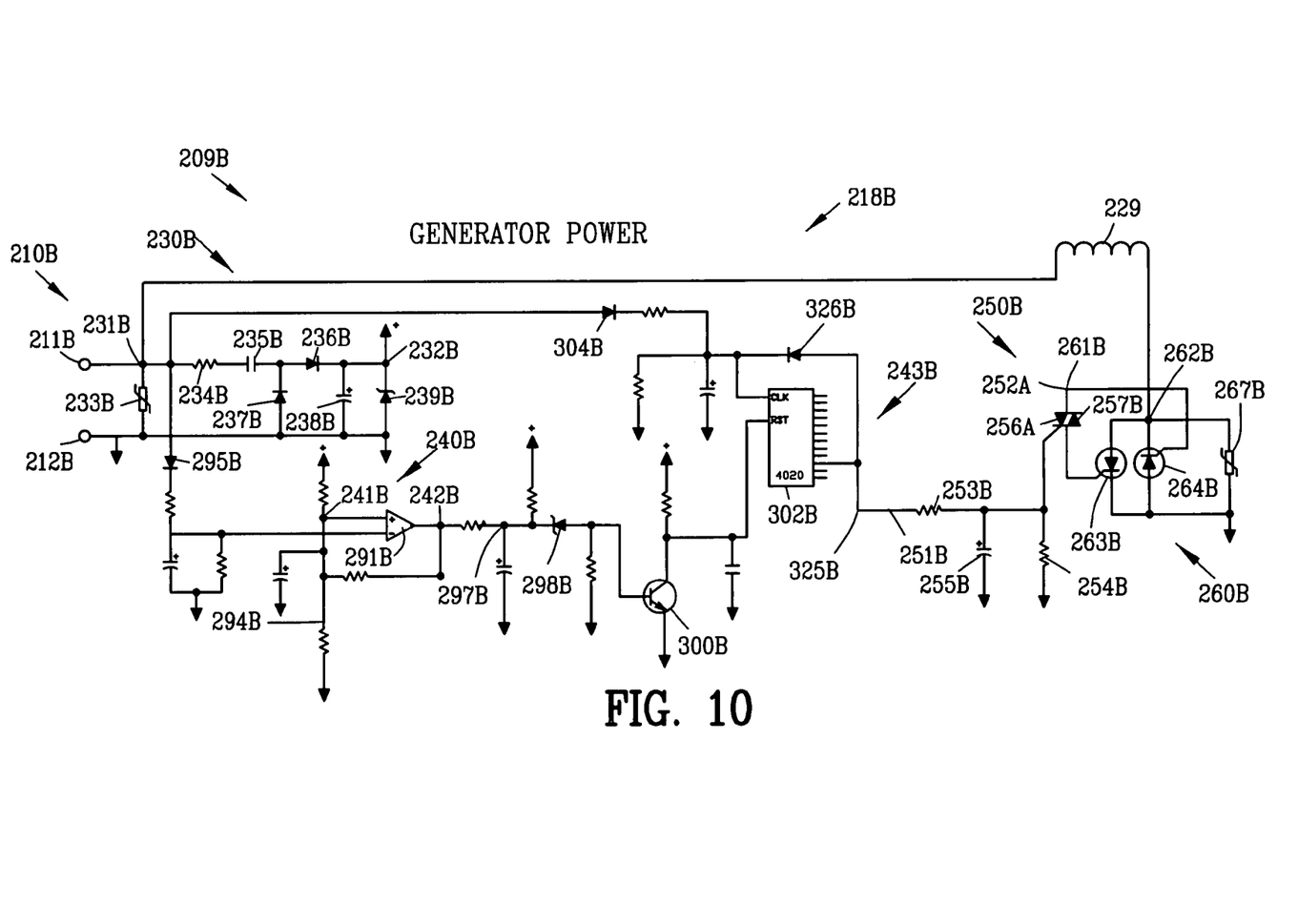
FIG. 10 is a detailed diagram of the circuit of FIGS. 8 and 9.

FIG. 10 is a detailed diagram of the actuator circuit 218B shown in FIGS. 8 and 9. The first and second terminals 211B and 212B of the second alternating current electrical power source 210B are connected to the rectifier circuit 230B of the second circuit 209B in a manner similar to FIG. 2. The first terminal 211B and the second terminal 212B of the second alternating current electrical power source 210B apply 120 volts to the rectifier circuit 230B of the second circuit 209B. The regulated direct current voltage from the rectifier circuit output 32A is applied to the control input 241B of the control circuit 240B.

The voltage of the first terminal 211B of the second alternating current electrical power source 210B is applied through diode 295B to the inverting input of the comparator 291B. The resistance capacitance circuit located at the inverting input of the comparator 291B stores the peak value of the voltage of the first terminal 211B of the second alternating current electrical power source 210B.

The comparator 291B compares the peak value of the voltage on the first terminal 211B relative to the reference voltage from the voltage divider circuit 294B. A nominal voltage between the first terminal 211B and the second terminal 212B, the reference voltage on the non-inverting input of the comparator 291B provides signal on the control output 242B.

The control circuit 240B incorporates the time delay circuit 243B for delaying the connection of the load 216RV to the second alternating current electrical power source 210B for enabling the second alternating current electrical power source 210B to warm up and to stabilize prior to the application of an electrical load.

The signal from the control output 242B is applied through an integrator circuit 297B and a Zener diode 298B to an input of an inverter circuit 300B. The time delay circuit 243B includes a binary ripple counter 302B. The output of the inverter circuit 300B is connected to a reset input of the binary ripple counter 302B.

The binary ripple counter 302B receives positive half cycle pulses from the first terminal 211B through a diode 304B. The half cycle pulses from the first terminal 211B are counted by the binary ripple counter 302B to provide the desired thirty (30) second delay.

The binary ripple counter 302B generates a signal on conductor 325B to the driver input 251B of the driver circuit 250B. In addition, the signal on conductor 325B from the binary ripple counter 302B is applied through diode 326B to the clock input of the binary ripple counter 102B to cease the counting thereof.

The driver circuit 250B actuates the switching circuit 260B. The actuation of the switching circuit 260B energizes the contactors 220 to provide power from the second alternating current electrical power source 210B to the load 16RV.

The second alternating current electrical power source 210B will remain connected to the load 16RV during normal operation of the second alternating current electrical power source 210B. The first alternating current electrical power source 210A cannot be actuated until termination of the second alternating current electrical power source 210B. It should be appreciated by those skilled in the art that the dominance of the second alternating current electrical power source 210B over the first alternating current electrical power source 210A may be reversed for other applications.

The contactor control circuit provides a safe and reliable automatic switching upon the application of power to the contactor control circuit. Several safety features related to the alternating current electrical power source may be incorporated into the contactor control circuit. The contactor control circuit is capable of operating a reversing contactor for connecting a first and a second alternating current electrical power source to a load. The contactor control circuit incorporates an interlock circuit for preventing the simultaneous connection of a first and a second alternating current electrical power source to a load. The contactor control circuit is adaptable to either 120 volt operation or 240 volt operation.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A contactor control circuit for controlling a contactor connecting an alternating current electrical power source to a load, the contactor having an inductor for energizing the contactor, comprising:

a switching circuit connected in series with the inductor for controlling the conduction of the contactor;

a driver circuit connected for controlling the conduction of said switching circuit;

a control circuit connected for actuating and deactuating said driver circuit;

a rectifier circuit having a rectifier input for connection to the alternating current electrical power source;

said rectifier circuit providing direct current rectifier output to said control circuit for actuating conduction of said driver circuit and said switching circuit to conduct current through the inductor for energizing said contactor to connect the alternating current electrical power source to the load; and said switching circuit including a bidirectional solid state switch.

2. A contactor control circuit for controlling a contactor connecting an alternating current electrical power source to a load, the contactor having an inductor for energizing the contactor, comprising:

a switching circuit connected in series with the inductor for controlling the conduction of the contactor;

a driver circuit connected for controlling the conduction of said switching circuit;

a control circuit connected for actuating and deactuating said driver circuit;

a rectifier circuit having a rectifier input for connection to the alternating current electrical power source;

said rectifier circuit providing direct current rectifier output to said control circuit for actuating conduction of said driver circuit and said switching circuit to conduct current through the inductor for energizing said contactor to connect the alternating current electrical power source to the load;

said switching circuit including a bidirectional solid state switch having a first and a second solid state switch input; and said driver circuit comprising a first and a second driver switch connected to said first and second solid state switch inputs, respectively.

3. A contactor control circuit for controlling a contactor connecting an alternating current electrical power source to a load, the contactor having an inductor for energizing the contactor, comprising:

a switching circuit having switching circuit input for controlling the conduction of a solid state switch within said switching circuit;

said solid state switch being connected in series with the inductor of the contactor;

a driver circuit having a driver switch input for controlling the conduction of a driver switch within said driver circuit;

said driver switch connected to said switching input for driving said solid state switch into a conductive state;

a control circuit connected to said driver circuit input for actuating and deactuating said driver switch;

a rectifier circuit having a rectifier input connected to the alternating current electrical power source for providing a direct current on a rectifier output; and said rectifier output of said rectifier circuit providing direct current power to said control circuit for actuating conduction of said driver switch and said solid state switch to conduct current through the inductor for energizing said contactor to connect the alternating current electrical power source to the load.

4. A contactor control circuit for controlling a contactor connecting an alternating current electrical power source to a load, the contactor having an inductor for energizing the contactor, comprising:

a switching circuit having switching circuit input for controlling the conduction of a bidirectional solid state switch within said switching circuit;

said bidirectional solid state switch being connected in series with the inductor of the contactor;

a driver circuit having a driver switch input for controlling the conduction of a bidirectional driver switch within said driver circuit;

said bidirectional driver switch connected to said switching input for driving said bidirectional solid state switch into a conductive state;

a control circuit connected to said driver circuit input for actuating and deactuating said bidirectional driver switch;

a rectifier circuit having a rectifier input connected to the alternating current electrical power source for providing a direct current on a rectifier output; and said rectifier output of said rectifier circuit providing direct current power to said control circuit for actuating conduction of said bidirectional driver switch and said bidirectional solid state switch to conduct current through the inductor for energizing said contactor to connect the alternating current electrical power source to the load.

5. A contactor control circuit as set forth in claim 4, wherein said control circuit includes an open neutral circuit for deactuating said driver circuit upon a detection of a disconnected neutral line in the alternating current electrical power source.

6. A contactor control circuit as set forth in claim 4, wherein said control circuit includes an overvoltage and/or undervoltage circuit for deactuating said driver circuit upon a detection of an undesirable high or low voltage in the alternating current electrical power source.

7. A contactor control circuit as set forth in claim 4, wherein said control circuit includes a reverse polarity circuit for deactuating said driver circuit upon a detection of an undesirable reversal of polarity in the alternating current electrical power source.

8. A contactor control circuit as set forth in claim 4, wherein said control circuit includes a ground monitor circuit for deactuating said driver circuit upon a detection of an undesirable open ground.

9. A contactor control circuit as set forth in claim 4, wherein said control circuit includes a time delay circuit for delaying actuation of said driver circuit for period of time after connection to the alternating current electrical power source.

10. A contactor control circuit as set forth in claim 4, wherein said rectifier circuit comprises a capacitively coupled rectifier circuit having a series capacitor interposed in said rectifier input connected to the alternating current electrical power source.

11. A contactor control circuit as set forth in claim 4, wherein said rectifier circuit comprises a half wave rectifier circuit including a filter capacitor and a zener diode voltage regulator.

\* \* \* \* \*